(12) United States Patent
    Brown

(10) Patent No.: US 8,864,005 B2
(45) Date of Patent: *Oct. 21, 2014

(54) METHODS FOR SCRIBING AND SEPARATING STRENGTHENED GLASS SUBSTRATES

(75) Inventor: James William Brown, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 472 days.

This patent is subject to a terminal disclaimer.

(21) Appl. No.: 13/159,756

(22) Filed: Jun. 14, 2011

(65) Prior Publication Data

US 2012/0011981 A1    Jan. 19, 2012

Related U.S. Application Data

(60) Provisional application No. 61/364,980, filed on Jul. 16, 2010.

(51) Int. Cl.
    *B26F 3/00*      (2006.01)
    *B26D 3/08*      (2006.01)
    *C03B 33/10*     (2006.01)
    *C03B 33/02*     (2006.01)
    *C03B 23/027*    (2006.01)
    *C03B 33/023*    (2006.01)

(52) U.S. Cl.
    CPC .............. *C03B 33/02* (2013.01); *C03B 33/107* (2013.01); *C03B 23/027* (2013.01); *C03B 33/023* (2013.01); *B26D 3/085* (2013.01)
    USPC ................................................ 225/2; 83/880

(58) Field of Classification Search
    USPC ............ 83/880; 219/121.69, 121.68, 121.67, 219/121.7, 121.71; 225/2, 103, 96.5; 428/426, 43, 192; 65/30.1, 112
    See application file for complete search history.

(56) References Cited

U.S. PATENT DOCUMENTS 3,956,547 A    5/1976    DeTorre
4,289,261 A    9/1981    Dahlberg
(Continued)

FOREIGN PATENT DOCUMENTS

CN    1252390         5/2000
CN    1437018 A       8/2003
(Continued)

OTHER PUBLICATIONS

PCT/US2011/043510 Search Report.
(Continued)

*Primary Examiner* — Ghassem Alie
(74) *Attorney, Agent, or Firm* — John T. Haran

(57) ABSTRACT

A method of forming a scribe line in a strengthened glass substrate includes providing a strengthened glass substrate having a first surface, a second surface, a first edge and a second edge. The first and second surfaces have a strengthened surface layer under a compressive stress, and a central region under tensile stress. The method further includes applying a scoring blade to the first surface at an initiation location that is offset from the first edge by an initiation offset distance greater than a diameter of the scoring blade, and translating the scoring blade or the strengthened glass substrate such that the scoring blade scores the first surface. The translation is terminated such that the scoring blade stops at a termination location that is offset from the second edge of the strengthened glass substrate by a termination offset distance greater than the diameter of the scoring blade.

12 Claims, 4 Drawing Sheets

(56) References Cited

U.S. PATENT DOCUMENTS

| | | | |
|---|---|---|---|
| 4,341,139 A | 7/1982 | DeTorre | |
| 4,427,143 A | 1/1984 | Hyatt | |
| 4,487,350 A | 12/1984 | DeTorre | |
| 6,402,004 B1 | 6/2002 | Yoshikuni et al. | |
| 7,131,562 B2 | 11/2006 | Ueyama | |
| 7,439,665 B2 | 10/2008 | Wakayama | |
| 7,523,846 B2 | 4/2009 | Takamatsu | |
| 7,553,390 B2 * | 6/2009 | Yamabuchi et al. | 156/257 |
| 2004/0187659 A1 | 9/2004 | Nishiyama | |
| 2005/0056127 A1 | 3/2005 | Yamabuchi et al. | |
| 2005/0221044 A1 * | 10/2005 | Gaume et al. | 428/43 |
| 2005/0258135 A1 * | 11/2005 | Ishikawa et al. | 216/24 |
| 2008/0217311 A1 | 9/2008 | Eberhardt et al. | |
| 2008/0264994 A1 | 10/2008 | Herve et al. | |
| 2009/0262092 A1 | 10/2009 | Halsey, IV et al. | |
| 2010/0119846 A1 * | 5/2010 | Sawada | 428/426 |
| 2010/0170558 A1 | 7/2010 | Stein | |
| 2010/0210442 A1 | 8/2010 | Abramov et al. | |
| 2010/0272134 A1 | 10/2010 | Blanding et al. | |
| 2011/0017713 A1 | 1/2011 | Abramov et al. | |
| 2011/0127242 A1 | 6/2011 | Li | |
| 2011/0183116 A1 | 7/2011 | Hung et al. | |
| 2011/0226832 A1 | 9/2011 | Bayne et al. | |
| 2012/0011981 A1 | 1/2012 | Brown | |

FOREIGN PATENT DOCUMENTS

| | | |
|---|---|---|
| CN | 1930097 | 3/2007 |
| CN | 101605840 A | 12/2009 |
| CN | 101687686 A | 3/2010 |
| CN | 101962262 A | 2/2011 |
| CN | 201890842 U | 7/2011 |
| EP | 1491309 A1 | 12/2004 |
| GB | 2165174 A | 4/1986 |
| JP | 2008247732 | 10/2008 |
| JP | 2011026193 | 2/2011 |
| KR | 20110009639 | 1/2011 |
| TW | 200902467 | 1/2009 |
| TW | 201107257 | 3/2011 |
| WO | 2008100331 | 8/2008 |
| WO | 2008133800 | 11/2008 |
| WO | 2011084561 | 7/2011 |
| WO | 2011116165 | 9/2011 |

OTHER PUBLICATIONS

International Search Report and Written Opinion; PCT/US2011/043510 filed Jul. 11, 2011; ISR mail date: Jun. 10, 2011.
International Search Report and Written Opinion; PCT/US2011/028777 filed Mar. 11, 2011; ISR mail date: Jul. 21, 2011.
European Patent Office Communication pursuant to Rules 161(1) and 162 EPC; EP Application No. 11738888.4.
International Search Report & Written Opinion in PCT/US2013/041591 filed May 17, 2013; ISR mail date: Aug. 21, 2013.
Office Action Dated Feb. 14, 2014 filed in European Patent Application No. 11711203.7.
Office Action Mailed Apr. 8, 2014 filed in U.S. Appl. No. 13/935,085.
Chinese Office Action filed in Patent Application No. 201180014471.2 dated Jul. 2, 2014.
Advisory Action filed in U.S. Appl. No. 13/050,281 dated Jul. 25, 2014.

* cited by examiner

METHODS FOR SCRIBING AND SEPARATING STRENGTHENED GLASS SUBSTRATES

CROSS-REFERENCE TO RELATED APPLICATIONS

This application claims the benefit of priority under 35 U.S.C. §119 of U.S. Provisional Application Ser. No. 61/364,980 filed on Jul. 16, 2010 the content of which is relied upon and incorporated herein by reference in its entirety.

BACKGROUND

1. Field

The present specification generally relates to methods for separating glass substrates and, more specifically, to methods for scribing and separating strengthened glass substrates.

2. Technical Background

Thin glass substrates have a variety of applications in consumer electronic devices. For example, glass substrates may be used as cover sheets for LCD and LED displays incorporated in mobile telephones, display devices such as televisions and computer monitors, and various other electronic devices. Cover sheets used in such devices may be formed by sectioning or separating a large glass substrate into a plurality of smaller glass substrates. For example, glass substrates may be separated by scribe-and-break techniques. However, when scribe-and-break techniques are utilized to separate strengthened glass, such as ion-exchanged glass, uncontrollable full-body separation or shattering may occur rather than the formation of a scribe line. The uncontrolled separation generally leads to poor edge characteristics or complete destruction of the glass substrate. Further, the scoring device used to score the strengthened glass may not be able to penetrate the compressive surface of the strengthened glass, thereby preventing the formation of a scribe line.

Accordingly, a need exists for alternative methods for forming scribe lines and separating strengthened glass substrates.

SUMMARY

In one embodiment, a method of forming a scribe line in a strengthened glass substrate includes providing a strengthened glass substrate having a first surface, a second surface, a first edge and a second edge. Each of the first and second surfaces has a strengthened surface layer under a compressive stress and extending from the surface to a depth of layer, and a central region between the first and second surfaces under tensile stress. The method further includes applying a scoring blade to the first surface at an initiation location that is offset from the first edge by an initiation offset distance that is greater than a diameter of the scoring blade, and translating the scoring blade or the strengthened glass substrate such that the scoring blade scores the first surface along a desired line of separation. The translation of the scoring blade or the strengthened glass substrate is terminated such that the scoring blade stops at a termination location that is offset from the second edge of the strengthened glass substrate by a termination offset distance that is greater than the diameter of the scoring blade.

In another embodiment, a method of separating a strengthened glass substrate includes providing the strengthened glass substrate, wherein the strengthened glass substrate has a first surface, a second surface, a first edge and a second edge. Each of the first surface and the second surface has a strengthened surface layer under a compressive stress and extending from the surface to a depth of layer, and a central region between the first surface and the second surface that is under tensile stress. The method further includes applying a scoring blade to the first surface at an initiation location such that the initiation location is offset from the first edge by an initiation offset distance that is greater than a diameter of the scoring blade, and translating the scoring blade or the strengthened glass substrate such that the scoring blade scores the first surface along a desired line of separation, thereby forming a scribe line. The translation of the scoring blade or the strengthened glass substrate is terminated such that the scoring blade stops at a termination location that is offset from the second edge of the strengthened glass substrate by a termination offset distance that is greater than the diameter of the scoring blade. The method further includes applying a bending moment about the scribe line to controllably break the strengthened glass substrate along the scribe line, thereby separating the strengthened glass substrate.

In yet another embodiment, a strengthened glass article includes a first surface, a second surface, and at least one edge joining the first and second surfaces. Each of the first surface and the second surface has an ion exchanged strengthened surface layer under a compressive stress and extending from the surface to a depth of layer, and a central region between the first surface and the second surface that is under tensile stress. The at least one edge is formed by applying a scoring blade to a first surface of a strengthened glass substrate at an initiation location that is offset from the first edge of the strengthened glass substrate by an initiation offset distance that is greater than a diameter of the scoring blade, translating the scoring blade or the strengthened glass substrate such that the scoring blade scores the first surface along a desired line of separation, terminating the translation of the scoring blade or the strengthened glass substrate such that the scoring blade stops at a termination location that is offset from a second edge of the strengthened glass substrate by a termination offset distance that is greater about than the diameter of the scoring blade, and applying a bending moment about the scribe line to controllably break the strengthened glass substrate along the scribe line, thereby separating the strengthened glass substrate.

Additional features and advantages of the methods will be set forth in the detailed description which follows, and in part will be readily apparent to those skilled in the art from that description or recognized by practicing the embodiments described herein, including the detailed description which follows, the claims, as well as the appended drawings.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
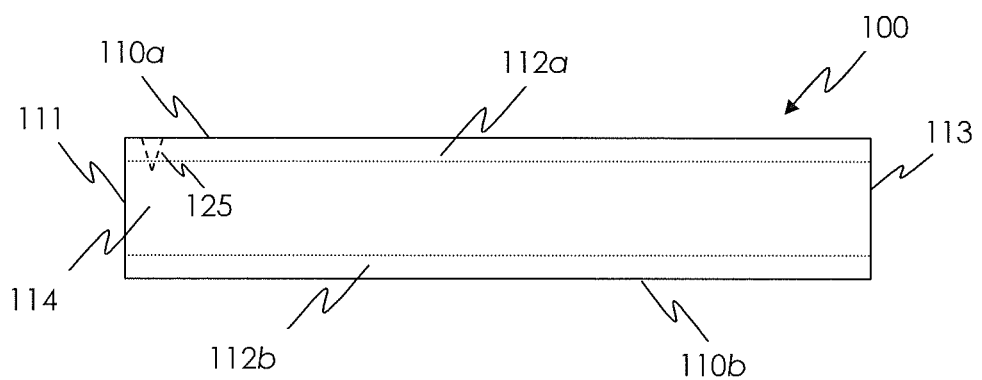
FIG. 1 schematically depicts a cross sectional view of a chemically strengthened glass substrate according to one or more embodiments described and illustrated herein.

Reference will now be made in detail to various embodiments of methods for forming scribe lines in strengthened glass substrates and separating strengthened glass substrates by the formation of scribe lines. Whenever possible, the same reference numerals will be used throughout the drawings to refer to the same or like parts. As described herein, methods for forming a scribe line in a strengthened glass substrate generally comprise applying a scoring blade to a first surface (e.g., a top surface) at an initiation location that is offset from a first edge of strengthened glass substrate. The scoring angle of the scoring blade, as well as the force applied to the strengthened glass substrate, are such that a scribe line created by the application of the scoring blade does not extend too deeply into a central region under tensile stress. The scoring blade or the glass substrate is translated such that the scoring blade scores the first surface, thereby forming the scribe line. The translation may be terminated prior to the scoring blade reaching a second edge of the strengthened glass substrate. The strengthened glass substrate may be separated by the application of a mechanical force about the formed scribe line. Various embodiments of the methods for forming scribe lines in strengthened glass substrates, methods for the separation of strengthened glass substrates, and strengthened glass articles will be described in more detail herein.

Referring to FIG. 1, an exemplary strengthened glass substrate 100 is illustrated. The strengthened glass substrate 100 has a first surface 110a, a second surface 110b, and edges (e.g., a first edge 111 and a second edge 113). The strengthened glass substrate 100 may be chemically strengthened by an ion-exchange process to produce strengthened surface layers 112a, 112b and a central region 114 within the glass substrate. The glass substrate may be formed from various glass compositions including, without limitation, soda lime silicate glasses, borosilicate glasses, aluminosilicate glasses, and aluminoborosilicate glasses, including ion-exchanged borosilicate, aluminosilicate glasses, and aluminoborosilicate glasses. As an example and not a limitation, the glass substrate may be Corning Gorilla® glass.

Figure 2:
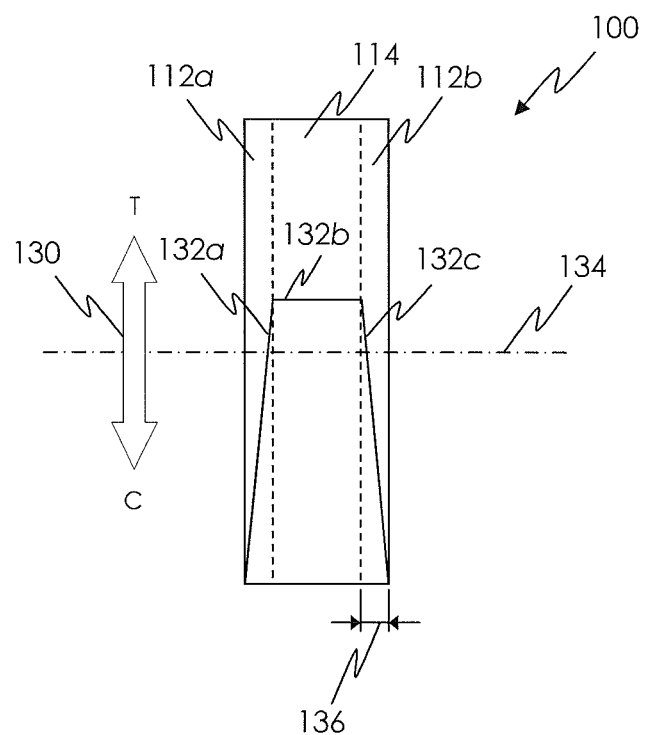
FIG. 2 graphically depicts compressive and tensile stresses within a chemically strengthened glass substrate according to one or more embodiments described and illustrated herein.

The strengthened glass substrate 100 comprises two strengthened surface layers 112a and 112b, and a central region 114. The strengthened surface layers 112a and 112b are kept in a compressive stress state that provides the strengthened glass substrate 100 its high strength. The central region 114 is under tensile stress to compensate for the compressive stresses in the strengthened surface layers 112a and 112b such that the forces balance each other and the strengthened glass substrate 100 does not fracture. FIG. 2 graphically illustrates a stress profile of an exemplary strengthened glass substrate 100. The two strengthened surface layers 112a and 112b have an ion-exchange depth of layer (DOL) as indicated by depth 136. The DOL in some embodiments may be greater than $1/30^{th}$ of the total thickness of the strengthened glass substrate.

Graph lines 132a, 132b, and 132c illustrate the stress profile in different regions of the glass substrate. Line 134 represents zero stress forces and arrow 130 represents increasing/decreasing compressive and tensile stresses. As illustrated in FIG. 2, the stress profile in the strengthened surface layers 112a and 112b of the exemplary strengthened glass substrate 100 are under significant compressive stress (e.g., about 600 MPa or more near the surface of the strengthened glass substrate 100). The center tension of the inner tension region increases as a reaction to the increase of compressive surface stress (e.g., up to about 45 MPa in one embodiment). In general, the magnitude of central tension stress impacts the glass fragmentation and the magnitude of surface compressive stress determines the strength of the glass substrate.

Figure 3:
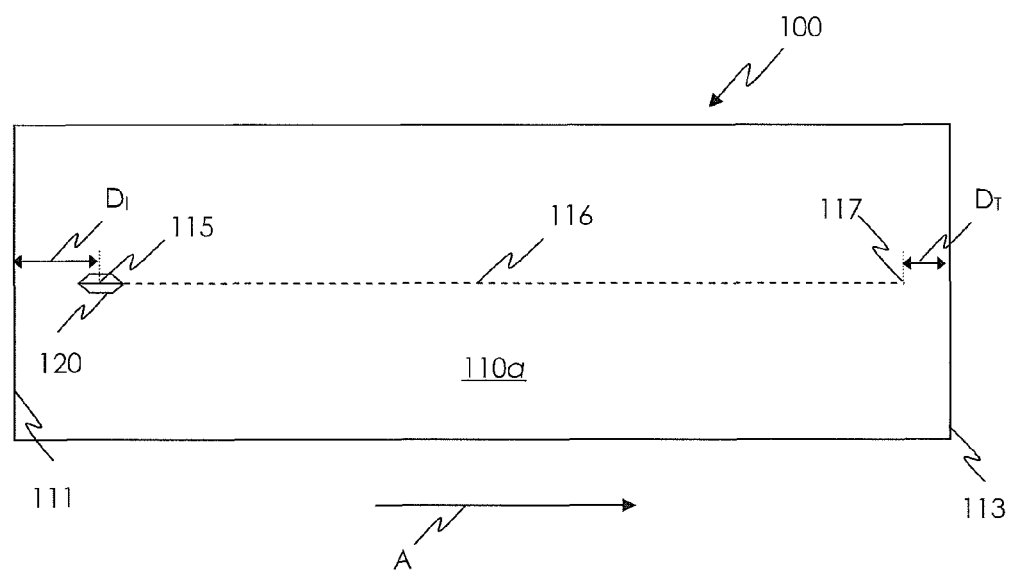
FIG. 3 schematically depicts a top view of a chemically strengthened glass substrate being scribed according to one or more embodiments described and illustrated herein.

Embodiments described herein utilize a scoring blade to mechanically form a scribe line by applying and translating the scoring blade across a surface of the strengthened glass substrate 100. FIG. 3 schematically depicts a strengthened glass substrate 100 and a scoring blade 120 applied thereto. The strengthened glass substrate 100 may be placed in a computer-controlled X, Y bridge machine (not shown). The bridge machine may control the movement of the scoring blade 120 along a desired line of separation 116. The desired line of separation 116 is the line on which the scoring blade is translated and the scribe line is formed. The strengthened glass substrate 100 may then be separated by mechanical force at the scribe line after the scribing process. In another embodiment, the scoring blade 120 may remain static and the strengthened glass substrate 100 may be mounted on a translation table that translates the strengthened glass substrate 100 with respect to the scoring blade 120.

Figure 4:
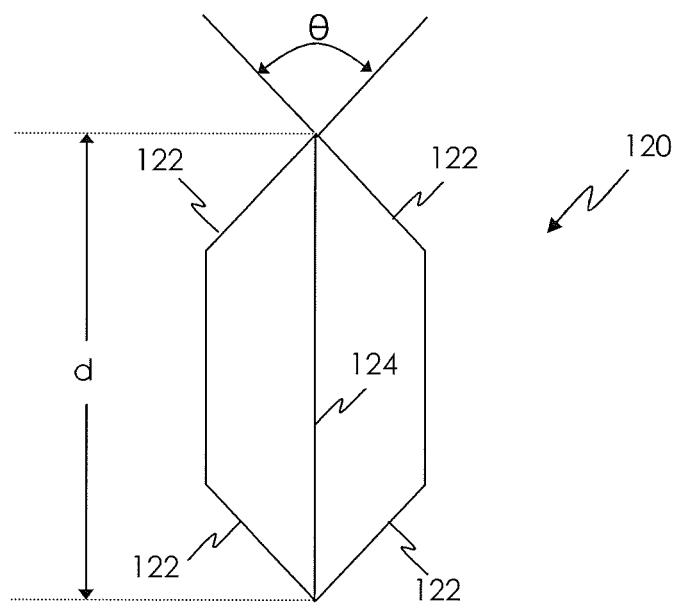
FIG. 4 schematically depicts a scoring blade according to one or more embodiments described and illustrated herein.

The scoring blade 120 may be applied to a first surface 110a of the strengthened glass substrate at an initiation location 115. It should be understood that the scoring blade 120 may also be applied to the second surface 110b. The scoring blade 120 may be any type of blade used to score glass. For example, the scoring blade 120 may be a scoring wheel, as illustrated in FIG. 4. However, the shape of the scoring blade 120 is not limited to a circular wheel and may have other configurations (e.g., rectangular). The scoring blade 120 may be made of materials such as tungsten carbide or diamond polycrystalline, for example.

As illustrated in FIG. 4, the scoring blade 120 may have angled walls 122 that define a scoring angle θ and a scribing edge 124. The scoring angle θ should be such that the scribing blade may effectively cut into the strengthened glass substrate without causing shattering or full-body separation. Too sharp of a scoring blade 120 may create a surface defect/scribe line that enters too deeply into the central region 114 under tensile stress and cause a full-body separation or shattering of the strengthened glass substrate. A scoring blade that is too dull may not be able to penetrate the strengthened surface layer to form a surface defect. In one embodiment, the scoring angle θ illustrated in FIG. 4 may be between about 100° and about 130° to form a surface defect 125 into the strengthened glass substrate 100 that does not extend too deeply into the central region 114.

The diameter d of the scoring blade 120 should be relatively small. Large diameter scoring blades may create uncontrollable cracks in the strengthened glass substrate 100. Although larger diameter scoring blades may be utilized, scoring blades having a diameter d that is less then or equal to 5 mm may consistently form a scribe line in the strengthened glass substrate 100.

The application of the scoring blade 120 on the surface 110a/110b creates a surface defect 125 at the impact location (FIG. 1). Microscopic evaluation of surface defects formed on the surface of strengthened glass substrates indicates that surface defects created at the impact location extend from the impact location toward both the edge closest to the impact location (e.g., first edge 111) and the opposite edge (e.g., second edge 113). The average length of the surface defect 125 created by the application of the scoring blade was measured to be about 1.5 times the diameter d of the scoring blade 120. The length of the surface defect 125 may be longer at the initiation location 115 than other locations along the desired line of separation 116, including the termination location 117. The initial impact of the scoring blade 120 on the strengthened glass substrate 100 may result in a transient increase of impact force at the initiation location such that a length of the surface defect 125 is greater at the impact location than other locations along the desired line of separation 116.

Applying the scoring blade 120 at an edge, or close to an edge, of a strengthened glass substrate during the scribing process may cause the surface defect 125 to reach the edge, and allow multiple cracks/vents to form within the strengthened glass substrate 100, which may uncontrollably veer from the desired line of separation or cause full-body separation or the strengthened glass substrate 100 to shatter. A single crack or vent following the desired line of separation 116 may enable the strengthened glass substrate 100 to be separated cleanly with smooth edges.

To prevent the formation of multiple, uncontrollable cracks, the scoring blade 120 may be applied to the first surface 110a of the strengthened glass substrate 100 at an initiation location 115 that is offset from the first edge 111 by an initiation distance $D_I$. The initiation distance $D_I$ should be large enough such that surface defect 125 radiating from the initiation location 115 toward the first edge 111 does not reach the first edge 111. Generally, the initiation distance $D_I$ should be greater than the diameter d of the scoring blade. Applying the scoring blade 120 at an initiation location that is offset from the first edge 111 by an initiation distance $D_I$ may prevent an open crack or cracks from forming and reaching the central region 114 of the strengthened glass substrate 100. If the initiation location 115 is positioned too close to the first edge 111 of the strengthened glass substrate 100, the surface defect 125 may reach the first edge 111 and cause the surface defect 125 to enter the central region 114 at or proximate the first edge 111 and form an open crack. In one embodiment, the initiation distance $D_I$ is at least two times the diameter d of the scoring blade 120, which may prevent the surface defect 125 created at the initiation location 115 from reaching the first edge 111.

The impact energy of the scoring blade 120 on the first surface 110a, both at initial impact and during translation, should be controllably maintained such that the surface defect 125 (and subsequently formed scribe line) does not extend too deeply into the central region 114 of the strengthened glass substrate 100. As illustrated in FIG. 1, the surface defect 125 may extend partially into the central region 114 under tensile stress. However, the strengthened glass substrate 100 may be sufficiently rigid to prevent full-body separation when the surface defect 125 minimally enters the central region 114. If the surface defect 125 enters too deeply into the central region 114, full-body separation or shattering may occur.

Generally, the impact energy of the scoring blade 120 on the first surface 110a should be such that a depth of the surface defect 125 and resulting scribe line is not greater than about twenty-five percent of the total thickness of the strengthened glass substrate 100. This may ensure that the majority of the surface defect 125 and scribe line is maintained mostly within the strengthened surface layers 112a or 112b. The impact energy is determined by the impact load of the scoring blade on the strengthened glass substrate as well as both the impact speed of the scoring blade upon initial impact on the strengthened glass substrate and the translation speed of the scoring blade during the scoring operation.

Regarding initial impact of the scoring blade on the strengthened glass substrate, as the impact force or load increases, the impact speed of the scoring blade on the strengthened glass substrate should decrease. As the impact speed increases, the impact force or load should decrease. For a fixed applied load, the impact energy increases with an increase of impact speed. Therefore, for a fixed applied load, the impact speed should be set such that the surface defect does not extend too deeply into the central region of the strengthened glass substrate (e.g., extending more than 25% of the total thickness of the strengthened glass substrate). The force and speed values of the scoring blade at initial impact may depend on characteristics of the strengthened glass substrate, such as glass composition, thickness, the compressive stresses, and DOL of the strengthened surface layers. Table 1 illustrates three strengthened glass substrates of different thicknesses having a tensile stress of 30 MPa in the central region and the maximum speed and impact force values resulting from experimental testing. Table 2 illustrates three strengthened glass substrates of different thicknesses having a tensile stress of 22 MPa in the central region and the maximum speed and impact force values resulting from experimental testing. It should be understood that the values listed in Tables 1 and 2 are for illustrative purposes only and are not intended as limitations.

TABLE 1

Strengthened Glass Substrate Having 30 MPa Central Region

| Glass Thickness | Impact Speed | Applied Load |
|---|---|---|
| 1.1 mm | 125 mm/s | 18N |
| 0.7 mm | 100 mm/s | 16N |
| 0.55 mm | 75 mm/s | 14N |

TABLE 2

Strengthened Glass Substrate Having 22 MPa Central Region

| Glass Thickness | Impact Speed | Applied Load |
|---|---|---|
| 1.1 mm | 100 mm/s | 18N |
| 0.7 mm | 90 mm/s | 16N |
| 0.55 mm | 50 mm/s | 14N |

Regarding impact energy during the translation of the scoring blade on the surface of the strengthened glass substrate, an increase of scoring speed of the scoring blade (i.e., translation speed) may necessitate a corresponding increase in applied force of the scoring blade on the surface on the strengthened glass substrate. As a general rule, a 50% increase in translation speed of the scoring blade 120 may necessitate a 15% increase in impact force to achieve a scribe line having a proper depth to enable separation of the strengthened glass substrate. Successful scribe line generation was performed at scribing speeds between 10 mm/s and 1000 mm/s. Table 3 illustrates scribing cracks of various depths resulting from different translation speeds and corresponding impact forces in 0.7 mm thick ion exchanged glass samples having a central tension region of 30 MPa. It should be understood that he values provided in Table 3 are illustrative and non-limiting.

TABLE 3

Scoring Speed and Scoring Force - 0.7 mm Thick CT-30 Glass

| Load | Scoring Speed | Median Crack Depth |
| --- | --- | --- |
| 12N | 250 mm | 109.5 μm |
| 12N | 500 mm | 100 μm |
| 15N | 250 mm | 117 μm |
| 15N | 500 mm | 109.5 μm |
| 18N | 250 mm | 125.5 μm |
| 18N | 500 mm | 111 μm |

In one embodiment, the force and speed of impact and translation of the scoring blade 120 on the first surface 110a of the strengthened glass substrate 100 is controlled by the use of a controllable pneumatic cylinder. The force may be controlled by a pressure valve of the pneumatic cylinder, and the impact speed on the first surface 110a may be controlled by controlling the flow rate of the pneumatic cylinder. Other methods of controlling the force and speed of the scoring blade may also be utilized, such as by the use of servo motors and hydraulic cylinders.

Referring once again to FIG. 3, the scoring blade 120 or the strengthened glass substrate is translated such that the scoring blade 120 traverses the first surface 110a of the strengthened glass substrate 100 along the desired line of separation 116 in direction A, thereby forming a scribe line that closely follows the desired line of separation 116. The X,Y bridge machine or translation table may be computer-controlled to translate the scoring blade 120 along the desired line of separation. The translation may be driven by one or more servo motors of the X, Y bridge machine or translation table.

As shown in FIG. 3, the scoring blade 120 may be stopped at a termination location 117 that is offset from the second edge 113 by a termination distance $D_T$. The termination distance $D_T$ should be large enough such that the scribe line does not extend past the final impact location of the scoring blade 120 to reach the second edge 113. The termination distance $D_T$ should be greater than the diameter d of the scoring blade. An uncontrollable crack or full-body separation may occur if the surface defect 125 reaches the second edge 113. As described above with respect to the initiation location 115, an open crack may form at or proximate to the second edge 113 if the surface defect 125 reaches the second edge 113 because the surface defect may extend into the central region 114. In one embodiment, the termination distance $D_T$ is at least about 1.5 times the diameter d of the scoring blade 120.

After forming a scribe line as described above, the strengthened glass substrate 100 may be separated into strengthened glass articles by applying a force about the scribe line. The force may be mechanically applied by a bending machine configured to apply a bending moment about the scribe line. The force may also be applied by pushing or pulling regions of the strengthened glass substrate such that a crack opens along the scribe line to separate the strengthened glass articles from the strengthened glass substrate. Any number of methods for applying a mechanical force to separate the strengthened glass substrate may be utilized.

Figure 5:
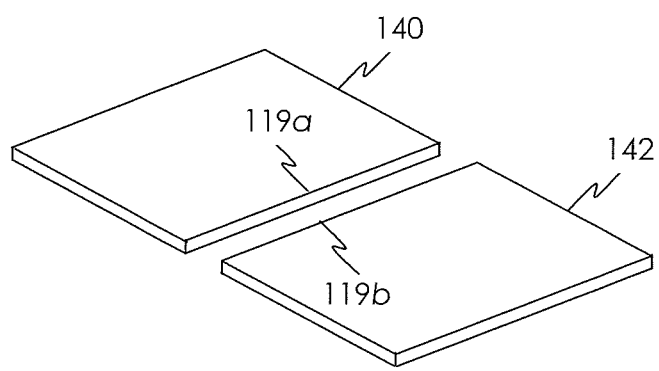
FIG. 5 schematically depicts a perspective view of two separated chemically strengthened glass articles according to one or more embodiments described and illustrated herein.

FIG. 5 illustrates two strengthened glass articles 140 and 142 that were separated from a strengthened glass substrate utilizing the methods described herein. The first and second strengthened glass articles 140, 142 have edges 119a and 119b, respectively, which were formed by first mechanically scoring a scribe line onto a surface of a strengthened glass substrate as described above. Following the formation of the scribe line, a mechanical force is applied to the strengthened glass substrate at the scribe line to controllably break the strengthened glass substrate into two strengthened glass articles 140, 142. Any number of strengthened glass articles may be separated from the strengthened glass substrate. The controlled force initiates a full body crack through the strengthened glass substrate 100 through the scribe line such that the strengthened glass articles have a predetermined edge.

As an example and not a limitation, a 0.7 mm thick ion-exchanged strengthened glass substrate having a 30 MPa center region, strengthened surface layers of 750 MPa, and a DOL of 27 μm, was separated using the methods described above. A 100° angle, 2 mm diameter scoring wheel was translated on the strengthened glass substrate at a rate of 500 mm/s and a scoring load of 18N to score the scribing line. The scoring wheel was applied at an initiation location that was offset from a first edge by about 5 mm. The translation of the scoring wheel was stopped at a termination location that was offset from a second edge (opposite from the first edge) by about 4 mm. The scribe line was formed without full-body separation or uncontrollable cracks or vents. The strengthened glass substrate was then separated by mechanical force about the scribe line.

It should now be understood that the methods described herein may be used to separate strengthened glass substrates, such as strengthened glass substrates made from borosilicate glasses, aluminosilicate glasses, and aluminoborosilicate glasses. Methods described herein may enable strengthened glass substrates to be separated by a scribe-and-break process, wherein a scribe line is mechanically formed by the application of a scribing blade. The formed scribe line does not contact an edge of the glass substrate, thereby preventing shattering due to impact of the scribing blade on a glass edge, spontaneous separation of the strengthened glass substrate due to a free crack under tension stress, and shattering due to impact defect. Strengthened glass substrates having scribe lines described herein may be separated by an application of force to the strengthened glass substrate along the scribe line to produce strengthened glass articles.

It will be apparent to those skilled in the art that various modifications and variations can be made to the embodiments described herein without departing from the spirit and scope of the claimed subject matter. Thus it is intended that the specification cover the modifications and variations of the various embodiments described herein, provided such modification and variations come within the scope of the appended claims and their equivalents.

What is claimed is:

1. A method of forming a scribe line in a chemically strengthened glass substrate, the method comprising:

providing the chemically strengthened glass substrate, the chemically strengthened glass substrate comprising a first surface, a second surface, a first edge and a second edge, wherein each of the first surface and the second surface has a chemically strengthened surface layer under a compressive stress and extending from the surface to a depth of layer, and a central region between the first surface and the second surface that is under tensile stress;

applying a scoring blade to the first surface at an initiation location, wherein the initiation location is offset from the first edge by an initiation offset distance that is greater than a diameter of the scoring blade;

translating the scoring blade or the chemically strengthened glass substrate such that the scoring blade scores a scribe line having a depth less than a total thickness of the chemically strengthened glass substrate into the first surface along a desired line of separation; and terminating the translation of the scoring blade or the chemically strengthened glass substrate such that the scoring blade stops at a termination location that is offset from the second edge of the chemically strengthened glass substrate by a termination offset distance that is greater than the diameter of the scoring blade to prevent full-body separation at the scribe line.

2. The method of claim 1, wherein the initiation offset distance is at least two times the diameter of the scoring blade.

3. The method of claim 1, wherein the termination offset distance is at least one and a half times greater than the diameter of the scoring blade.

4. The method of claim 1, wherein an impact energy applied to the first surface by the scoring blade is such that the scribe line has a depth that is less than twenty-five percent of a total thickness of the chemically strengthened glass substrate.

5. The method of claim 1, wherein an impact energy applied to the first surface by the scoring blade is between 15N and 19N.

6. The method of claim 1, wherein a translation speed of the scoring blade or the chemically strengthened glass substrate is greater than 10 mm/s.

7. The method of claim 1, wherein the diameter of the scoring blade is between 2 mm and 3 mm.

8. The method of claim 1, wherein a scoring angle of the scoring blade is between 100° and 130°.

9. A method of forming a scribe line in a chemically strengthened glass substrate, the method comprising:

providing the chemically strengthened glass substrate, the chemically strengthened glass substrate comprising a first surface, a second surface, a first edge and a second edge, wherein each of the first surface and the second surface has a chemically strengthened surface layer under a compressive stress and extending from the surface to a depth of layer, and a central region between the first surface and the second surface that is under tensile stress;

applying a scoring blade to the first surface at an initiation location with a scoring load between 15N and 19N and an impact speed between 75 mm/s and 125 mm/s, wherein the initiation location is offset from the first edge by an initiation offset distance that is greater than two times a diameter of the scoring blade;

translating the scoring blade or the chemically strengthened glass substrate at a scoring speed between 100 mm/s and 500 mm/s such that the scoring blade scores the first surface along a desired line of separation and at a depth of less than twenty-five percent of a total thickness of the chemically strengthened glass substrate; and terminating the translation of the scoring blade or the chemically strengthened glass substrate such that the scoring blade stops at a termination location that is offset from the second edge of the chemically strengthened glass substrate by a termination offset distance that is greater than one and a half times the diameter of the scoring blade.

10. The method of claim 9, wherein the total thickness of the chemically strengthened glass substrate is between 0.55 mm and 1.1 mm, and the tensile stress is between 20 MPa and 45 MPa.

11. The method of claim 9, wherein the diameter of the scoring blade is between 2 mm and 3 mm, and a scoring angle of the scoring blade is between 100° and 130°.

12. The method of claim 9, wherein the chemically strengthened surface layers have a compressive stress that is greater than 600 MPa, and a thickness that is greater than 1/30th of a thickness of the chemically strengthened glass substrate.

* * * * *